United States Patent [19]
Howell

[11] Patent Number: 5,684,403
[45] Date of Patent: Nov. 4, 1997

[54] METHOD AND APPARATUS FOR THE LOCATION OF REMOTE CONDUCTORS BY ANALYSIS OF SIGNALS INDUCED IN AN ANTENNA ARRAY

[76] Inventor: Mark Ian Howell, 23 Windsor Court, Bristol, BS8 4LJ, England

[21] Appl. No.: 573,381

[22] Filed: Dec. 15, 1995

[30] Foreign Application Priority Data

Dec. 15, 1994 [GB] United Kingdom ............... 9425331

[51] Int. Cl.$^6$ .......................... G01V 3/08; G01V 3/10; G01B 19/00
[52] U.S. Cl. .............................. 324/326; 324/67
[58] Field of Search ........................ 324/66, 67, 326, 324/327, 328, 329

[56] References Cited

U.S. PATENT DOCUMENTS 5,001,430 3/1991 Peterman et al. .............. 324/67

*Primary Examiner*—Walter E. Snow
*Attorney, Agent, or Firm*—Larson and Taylor

[57] ABSTRACT

An antenna array has three horizontal coils (A,B,C) with equal spacings s, and two coplanar vertical coils (D,E) with a horizontal spacing 2f. When it is located over one or more current-bearing buried conductors, signal currents (A,B,C,D,E) are induced in the coils. The difference value D–E is measured and compared with a value "D–E" calculated from the equations:

$$\text{``}(D-E)\text{''} = 2f(\text{``}d\text{''}^2 + f^2)$$

$$\text{``}d\text{''} = 2s(B-C)/[(A-B)-(B-C)].$$

Identity indicates that the signal source is a single conductor. A larger calculated value indicates plural sources with mainly vertical separation. A small calculated value indicates plural sources with mainly horizontal separation.

8 Claims, 3 Drawing Sheets

METHOD AND APPARATUS FOR THE LOCATION OF REMOTE CONDUCTORS BY ANALYSIS OF SIGNALS INDUCED IN AN ANTENNA ARRAY

BACKGROUND OF THE INVENTION

The present invention relates to apparatus and methods for the location of remote (typically buried) conductors (typically cables or pipelines). Such conductors typically carry complex currents, with many frequency components, owing to induction by various sources such as telecommunications cables, power cables, electrical plant and broadcasting stations. The present invention is particularly concerned with the situation where there are several conductors close together. Conventional techniques are unable to deal with such situations, and tend to give unreliable results. My own earlier application WO-A-94/19708 does provide an effective technique. By investigating induced signals carried by the conductors at a multiplicity of different frequencies it is possible to identify a frequency carried exclusively by a single conductor and use it to locate that conductor. E.g. an antenna array including three vertically spaced horizontal coils (A,B,C) is located over an apparent conductor position using vertical coils (D,E). For numerous frequencies, the terms SB/(A−B), 2SC/(A−C) and 2S(B−C)/[(A−B)−(B−C)] are determined (where S=coil spacing; X=signal strength of coil X). For an exclusive frequency the three values are identical and equal to the depth of the conductor.

SUMMARY OF THE INVENTION

The present invention concerns a simple technique for determining the spacing of two conductors. It can be used to determine whether a particular signal source is in fact a single conductor or a spaced pair of conductors. This may be used in conjunction with another location technique, preferably one according to WO-A-94/19708. If it is confirmed that a signal originates with a single conductor, then data relating to that conductor can be reliably determined.

One type of embodiment uses a "3H2V" coil array. That is, there are three substantially horizontal and two substantially vertical elongate coils. The "horizontal" coils are mutually parallel and vertically spaced (most conveniently being one above the other, with their axes in a common vertical plane). The "vertical" coils are mutually parallel and spaced apart. They extend vertically, with their axes preferably in, or close to, a common vertical plane. This may be the same plane as the plane of the horizontal coils, or it can be a plane at an angle thereto provided it is not at a right angle thereto. For such an array, it is possible to calculate the arithmetical difference between the signals induced in the two vertical coils by a conductor located symmetrically beneath them. The calculation involves known or measurable quantities. The actual difference value can also be determined. If the signal source is a single conductor, then the calculated value will be identical to the actual value. If they are found to differ, this indicates that the signal source is not a single conductor. Depending on what is required of the investigation, one would either then calculate the spacing of the signal sources, or one would change the investigation in an attempt to find a single source. (Typically this would mean investigating a different frequency, generally as discussed in WO94/19708).

DESCRIPTION OF THE PREFERRED EMBODIMENTS

Figure 1:
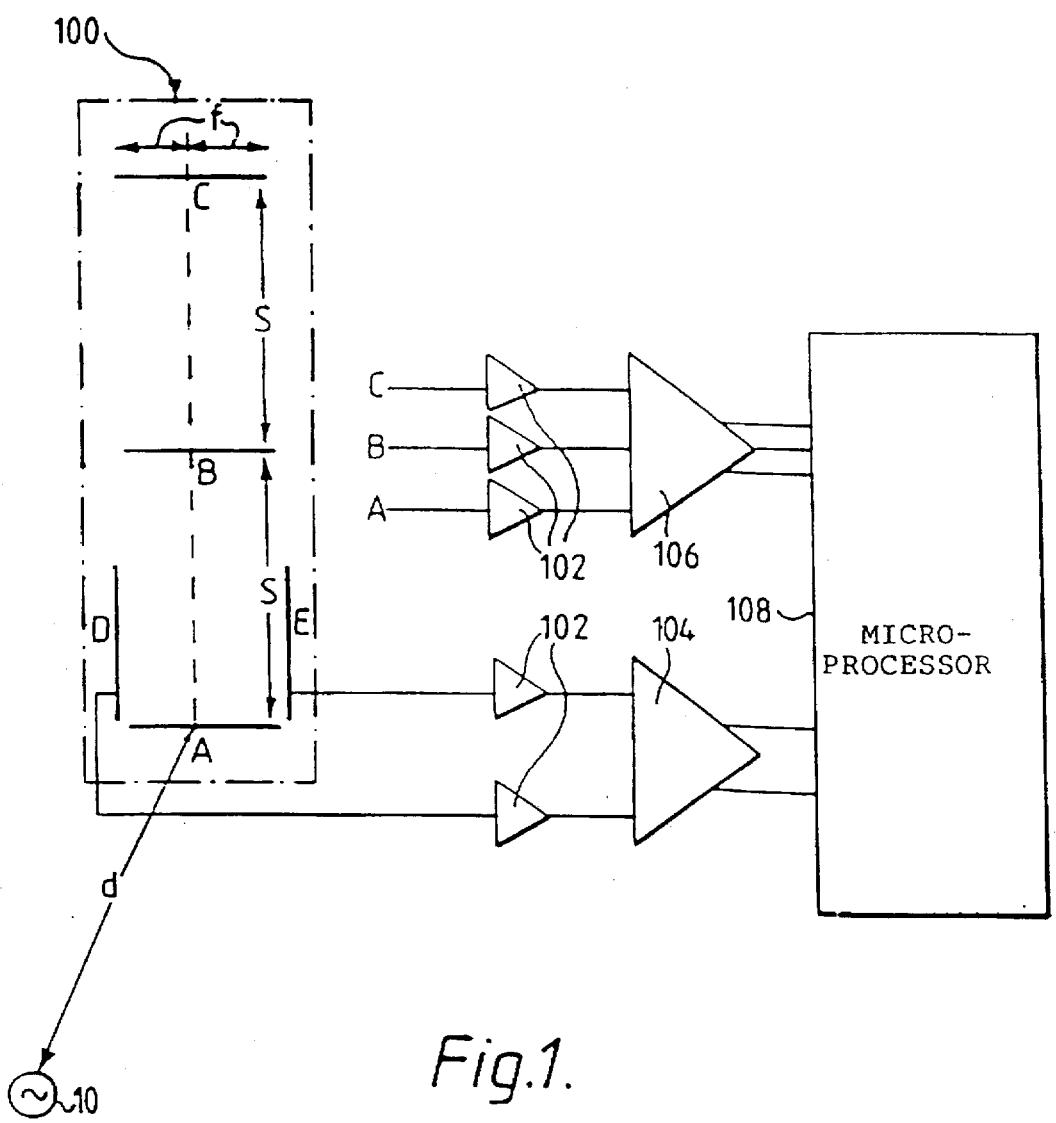
FIG. 1 is a schematic view of a 3H2V aerial coil array being employed in a method of the present invention.

FIG. 1 shows an aerial array having five coplanar coils A,B,C,D,E. That is, they are linear elongate coils and their axes fall in the same plane. This plane is substantially vertical in use. Three of the coils A, B, C are essentially identical. They extend horizontally, one above the other, with a common spacing s. The other two coils D,E are essentially mutually identical. They are mounted vertically, at the same vertical level, at the sides of the lower part of the 3H array. A mounting frame or housing for the coils is indicated schematically at 100. This may also house the electronics and controls. As shown schematically in FIG. 1, they may include a respective amplifier/buffer 102 for each coil. The outputs are fed to comparators 104,106 whose outputs are fed to a microprocessor 108.

A conductor 10 carrying an AC signal will induce voltages in the coils A,B,C,D,E. The voltage E induced in a coil X depends on the spacing and the angular relationship.

The five outputs may be treated as two sets of three: the outputs of the horizontal coils A, B, C, and the outputs of the bottom horizontal coil and the adjacent vertical coils A, D, E. The responses of these sets may be compared.

The depth d to a conductor that is a source of a "unique" frequency and is directly below the array is calculated as follows:

$$\text{``}d\text{''}=2s(B-C)/[(A-B)-(B-C)] \quad \text{(Equation 1)}$$

(Note: values in quotation marks (as "d") are values calculated from equations, as opposed to actual values, which will sometimes differ.)

The use of difference terms, (B−C) etc, gives common-mode rejection of all distant "incident" fluxes, so that only local fluxes come into the calculations.

(D+E)=0 in this situation, but (D−E) will give a finite value, since the outputs of D and E are in opposed phase.

The relationship between A, D, and E is sensitive to whether the source of the flux originates from one or several, spatially displaced, conductors. The value of (D−E) for a single source at usual depths may be accurately computed as follows:

$$\text{``}(D-E)\text{''}=2f\text{ ``}A\text{''}/\sqrt{(\text{``}d\text{''}^2+f^2)} \quad \text{(Equation 2)}$$

where "d"="depth" and f=half the D, E horizontal separation.

The "absolute" value of A may be calculated from the "difference" voltages of A, B; B, C as follows:

$$\text{``}A\text{''}=\tfrac{1}{2}s[((A-B)/(B-C))-1] \quad \text{(Equation 3)}$$

where s is the vertical separation between A and B, and between B and C.

Where a single source is below, (D−E), as measured, will equal "(D−E)" as derived from equations 2 and 3 above. Where several sources exist (D−E)≠"(D−E)". Also A will not equal "A".

The difference in outputs between the vertical coils, (D−E), can be measured. It can also be calculated:

$$\text{``}(D-E)\text{''}=2f\{(\tfrac{1}{2}s)[((A-B)/(B-C))-1]\}/\sqrt{\text{``}d\text{''}^2+f^2}$$

where "d"="depth" (or distance) to conductor as calculated from equation 1.

f=half the horizontal separation of coils D,E s=vertical separation of adjacent horizontal coils A,B,C.

Figure 2:
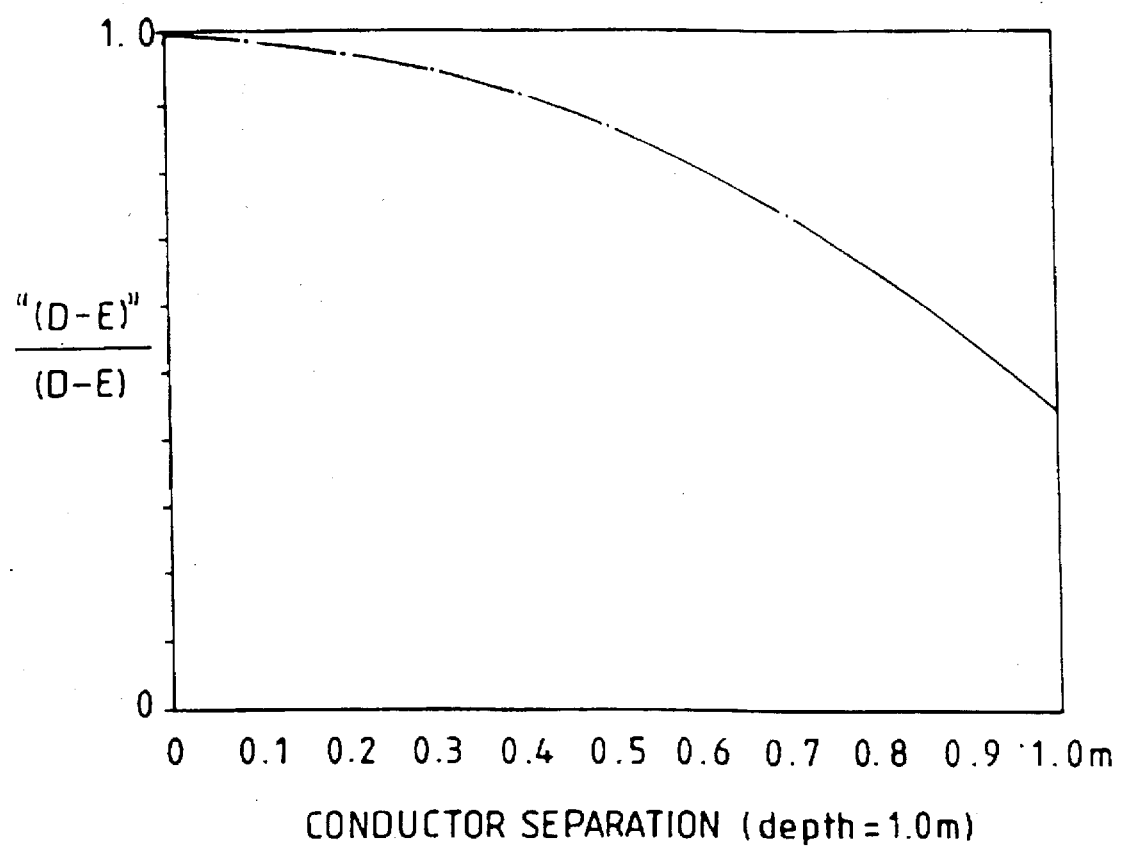
FIG. 2 is a graph for explaining how the spacing of remote conductors may be determined by means of the invention.

When the signals derive from a single conductor, then the calculated difference "(D–E)" is identical to the measured difference (R–E). But if there are two spaced conductors responsible for the signals, then the values diverge, to an extent which increases with the conductor spacing. FIG. 2 is a graph showing how the conductor separation alters the ratio of the measured and calculated differences, for conductors at a depth of 1.0 m.

Figure 3A:
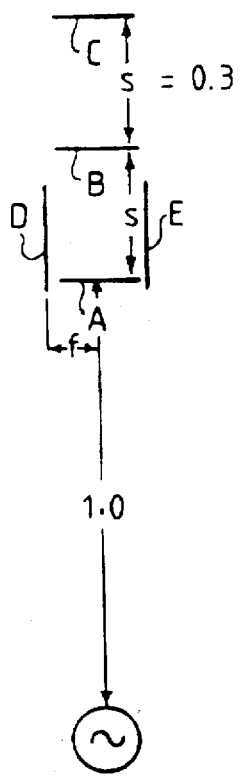
FIGS. 3 A, B and C are diagrammatic representations of examples of application of the invention.
Figure 3B:
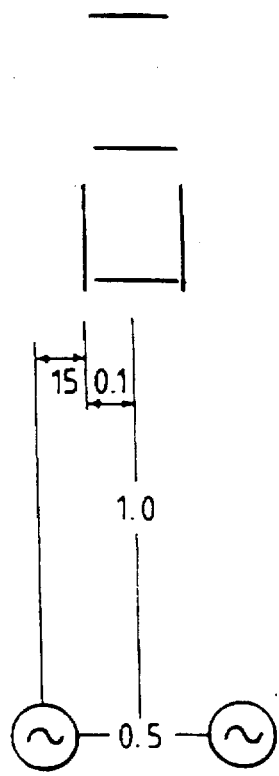
Figure 3C:
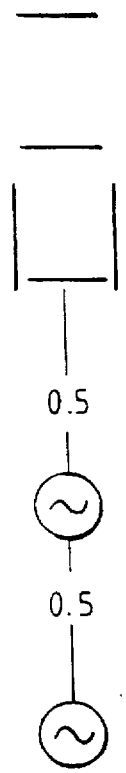

FIGS. 3A, B and C show a 3H2V aerial array in which the vertical coil spacing s=0.25 m and the horizontal coil spacing 2f=0.2 m. The array is shown as located 1 m above: a single conductor (FIG. 3A); a pair of conductors horizontally separated by 0.5 m, located symmetrically beneath the array (FIG. 3B); and a pair of conductors vertically spaced by 0.5 m, located centrally beneath the array (FIG. 3C). The data are as follows:

The technique may be used to calculate the spacing of conductors. Alternatively it may be simply applied to give a yes/no answer to the question: is the array over a single conductor? (More generally, the method will involve the investigation of a single frequency (or narrow frequency band) at a time. The question then becomes: does the frequency now being considered originate with a single conductor?)

Thus the following programme may be carried out automatically.

For each frequency examined:
1. Calculate $$"d": =2s(B-C)/[(A-B)-(B-C)]$$

2. Measure: (D–E)
3. Determine (to, say, ±5%):

$$(D-E)=/\neq 2f\{(½s)[((A-B)/(B-C))-1]\}/\sqrt{"d"^2+f^2}$$

4. YES/NO

An alternative approach to deriving "D–E)" has been found to give consistently good results, particularly with shallow conductors, for which the original approach was less reliable. Instead of equation (2), the following empirical equation (4) is used:

$$"(D-E)" = \frac{2f}{("d"^2+f^2)} = 2 \quad \text{(Equation 4)}$$

The value of "d" is taken from equation 1. The ratio (X) of the calculated value Z to the measured value of (D–E) is indicative of the location of the flux source:

$$Z/(D-E)=X$$

For any frequency or band of frequencies, if the flux source is exclusively directly below the antenna, then $$X=1$$

If there is more than one flux source, with mainly horizontal separation, then $$X<1$$

If there is more than one flux source, with mainly vertical separation, then $$X>1$$

I claim:

1. A method for investigating buried conductors which act as electromagnetic signal sources by virtue of currents flowing in them, said method comprising:

providing an antenna assembly which comprises three vertically spaced coils (A,B,C) whose axes are horizontal and two horizontally spaced coils (D,E) whose axes are vertical; locating the antenna assembly over a region believed to contain one or more buried conductors of interest; measuring the signals (D,E) induced in the two vertical-axis coils (D,E) and determining a measured difference value (D–E); measuring the three respective signals (A,B,C) induced in the three horizontal-axis coils (A,B,C); determining from said three respective signals and the known geometry of the antenna assembly a calculated difference value "(D–E)" that should be produced if the signals are induced by a single source; comparing the measured and calculated difference values thereby to obtain an indication of the singularity of the source or, as the case may be, an indication of the separation of plural sources.

2. A method according to claim 1 wherein the vertical axis coils (D,E) and the horizontal axis coils (A,B,C) have their axes substantially in the same vertical plane; the vertical axis coils (D,E) are mutually identical and have a spacing of 2f; the horizontal axis coils are mutually identical and the spacings (A–B, B–C) are identical and equal to s; and the calculated difference value "(D–E)" is calculated by means of the equations:

$$"(D-E)"=2f\,"A"/\sqrt{("d"^2+f^2)}$$

$$"A"=½s[\{(A-B)/(B-C)\}-1]$$

$$"d"=2s(B-C)/[(A-B)-(B-C)]$$

where "A" and "d" represent the values of A and d calculated from the above equations, d representing the distance of the source from the lowest horizontal-axis coil (A).

3. A method according to claim 1 wherein the vertical axis coils (D,E) and the horizontal axis coils (A,B,C) have their axes substantially in the same vertical plane; the vertical axis coils (D,E) are mutually identical and have a spacing of 2f; the horizontal axis coils are mutually identical and the spacings (A–B, B–C) are identical and equal to s; and the calculated difference value "(D–E)" is calculated by means of the equation:

$$"(D-E)"=2f("d"^2+f^2)$$

$$"d"=2s(B-C)/[(A-B)-(B-C)].$$

4. A method according to claim 1 including a step of locating the antenna assembly vertically over the signal source.

5. A method according to claim 1 wherein the process of comparing the measured and calculated difference values is repeated at different frequencies until an indication of singularity is obtained.

6. Apparatus for investigating buried conductors which act as electromagnetic signal sources by virtue of currents flowing in them comprising an antenna assembly which comprises three vertically spaced coils (A,B,C) whose axes are horizontal and two horizontally spaced coils (D,E) whose axes are vertical; comparator means for determining a measured difference value (D,E) between signals induced in the two vertical-axis coils; data processing means coupled to said horizontal axis coils for receiving signals induced in said horizontal axis coils and arranged to calculate, on the basis of the received signals and the known geometry of said antenna assembly, a calculated value ("D–E)") of the difference value between the signals induced in the two vertical axis coil that should be produced if the signals are induced in the two vertical axis coils by a single source.

7. Apparatus according to claim 6 wherein the vertical axis coils (D,E) and the horizontal axis coils (A,B,C) have their axes substantially in the same vertical plane; the vertical axis coils (D,E) are mutually identical and have a spacing of 2f; the horizontal axis coils are mutually identical and the spacings (A–B, B–C) are identical and equal to s; and wherein said data processing means is adapted to calculate the calculated difference value "(D–E)" by means of the equations:

$$"(D-E)"=2f\ "A"/\sqrt{("d"^2+f^2)}$$

$$"A"=\tfrac{1}{2}s[\{(A-B)/(B-C)\}-1]$$

$$"d"=2s(B-C)/[(A-B)-(B-C)]$$

where "A" and "d" represent the values of A and d calculated from the above equations, d representing the distance of the source from the lowest horizontal-axis coil (A).

8. Apparatus according to claim 6 wherein the vertical axis coils (D,E) and the horizontal axis coils (A,B,C) have their axes substantially in the same vertical plane; the vertical axis coils (D,E) are mutually identical and have a spacing of 2f; the horizontal axis coils are mutually identical and the spacings (A–B, B–C) are identical and equal to s; and wherein said data processing means is adapted to calculate the calculated difference value "(D–E)" by means of the equations $$"(D-E)"=2f("d"^2+f^2)$$

$$"d"=2s(B-C)/[(A-B)-(B-C)].$$

* * * * *